(12) United States Patent
Dunfee et al.

(10) Patent No.: US 12,152,707 B2
(45) Date of Patent: Nov. 26, 2024

(54) FITTING, FITTING ASSEMBLY, AND TORQUE ADAPTOR

(71) Applicant: Siemens Healthcare Diagnostics Inc., Tarrytown, NY (US)

(72) Inventors: William D. Dunfee, Newark, DE (US); Emily Pierce, Elkton, MD (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 0 days.

(21) Appl. No.: 17/998,714

(22) PCT Filed: May 12, 2021

(86) PCT No.: PCT/US2021/032084
§ 371 (c)(1),
(2) Date: Nov. 14, 2022

(87) PCT Pub. No.: WO2021/231645
PCT Pub. Date: Nov. 18, 2021

(65) Prior Publication Data
US 2023/0332720 A1    Oct. 19, 2023

Related U.S. Application Data

(60) Provisional application No. 63/024,842, filed on May 14, 2020.

(51) Int. Cl.
*F16L 19/025*    (2006.01)
*B25B 13/50*    (2006.01)
*F16L 19/02*    (2006.01)

(52) U.S. Cl.
CPC ........ *F16L 19/025* (2013.01); *B25B 13/5008* (2013.01); *F16L 19/0218* (2013.01)

(58) Field of Classification Search
CPC ..... F16L 19/02; F16L 19/025; F16L 19/0212; F16L 19/0218; F16L 19/04; F16L 19/041; F16L 19/043; F16L 19/046; F16L 19/05; F16L 19/055; B25B 13/5008; F16B 23/0007; F16B 23/0061; F16B 23/0092; F16B 25/0036
USPC .......... 411/402, 403, 404, 45, 406, 407, 410
See application file for complete search history.

(56) References Cited

U.S. PATENT DOCUMENTS

| | | | |
|---|---|---|---|
| 607,180 | A | 7/1898 | Landis |
| 2,294,637 | A | 9/1942 | Thomsen |
| 6,122,997 | A | 9/2000 | Altura |
| 2007/0209487 | A1 | 9/2007 | Helstern et al. |

(Continued)

FOREIGN PATENT DOCUMENTS

| | | |
|---|---|---|
| EP | 2846072 A1 | 3/2015 |
| JP | S54-103454 U | 7/1979 |

(Continued)

OTHER PUBLICATIONS

Extended EP Search Report dated Jul. 25, 2023 of corresponding European Application No. 21803927.9, 6 Pages.

*Primary Examiner* — Aaron M Dunwoody

(57) ABSTRACT

Embodiments provide a fitting for tubing connection, a male fitting assembly, and a torque adaptor. The fitting for tubing connection includes a head including a plurality of first gripping portions, each first gripping portion extending from a top of the head; and a shaft attached to the head, wherein the shaft comprises a plurality of external threads.

19 Claims, 9 Drawing Sheets

(56) References Cited

U.S. PATENT DOCUMENTS

| | | | |
|---|---|---|---|
| 2009/0067948 A1* | 3/2009 | Chung | F16B 37/14 |
| | | | 411/429 |
| 2013/0233053 A1 | 9/2013 | Beemer et al. | |
| 2014/0130580 A1 | 5/2014 | Mcadams et al. | |
| 2014/0144300 A1 | 5/2014 | Marchand | |
| 2014/0334894 A1 | 11/2014 | Marchand et al. | |
| 2015/0043979 A1 | 2/2015 | Bridge et al. | |
| 2015/0130185 A1 | 5/2015 | Knapp | |
| 2015/0152906 A1* | 6/2015 | Lai | F16B 23/003 |
| | | | 411/403 |
| 2015/0292658 A1* | 10/2015 | Stahn | F16L 25/12 |
| | | | 285/384 |
| 2018/0163904 A1 | 6/2018 | Nguyen | |
| 2019/0186670 A1 | 6/2019 | Jencks et al. | |
| 2019/0245313 A1 | 8/2019 | Odom | |

FOREIGN PATENT DOCUMENTS

| | | |
|---|---|---|
| JP | S56-140158 U | 10/1981 |
| JP | S61-197380 U | 12/1986 |
| JP | 2002-048277 A | 2/2002 |
| JP | 2006-017135 A | 1/2006 |
| JP | 2014-145397 A | 8/2014 |
| JP | 2017-057893 A | 3/2017 |
| JP | 2019-525086 A | 9/2019 |
| JP | 2019-208450 A | 12/2019 |
| WO | 00/77434 A1 | 12/2000 |
| WO | 2018/017965 A2 | 1/2018 |

\* cited by examiner

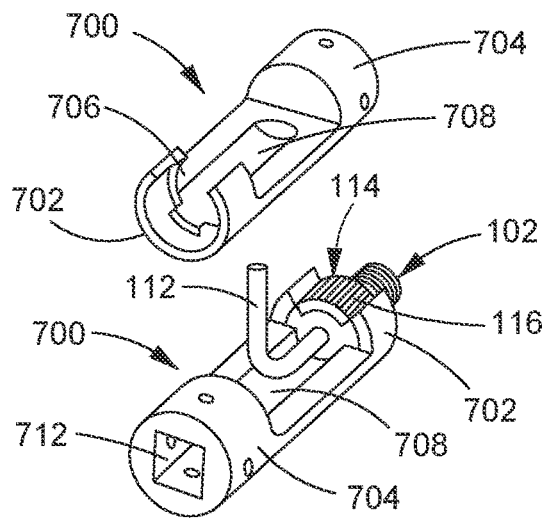
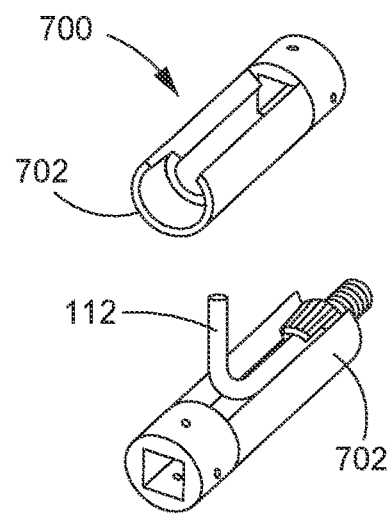
FIG. 7A　　　　　FIG. 7B
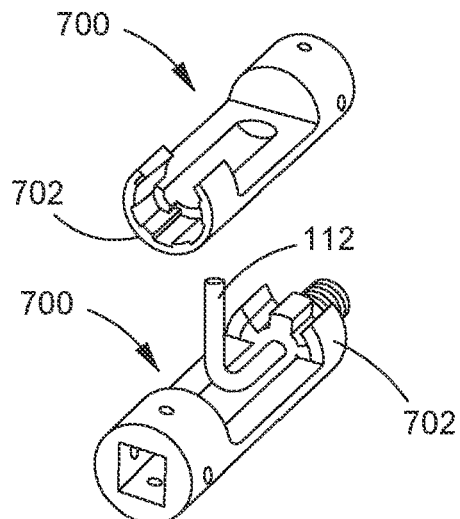
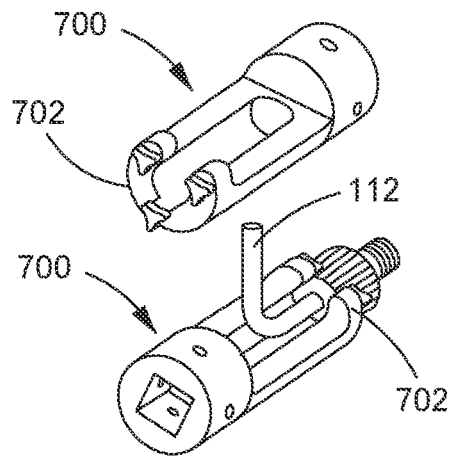
FIG. 7C　　　　　FIG. 7D
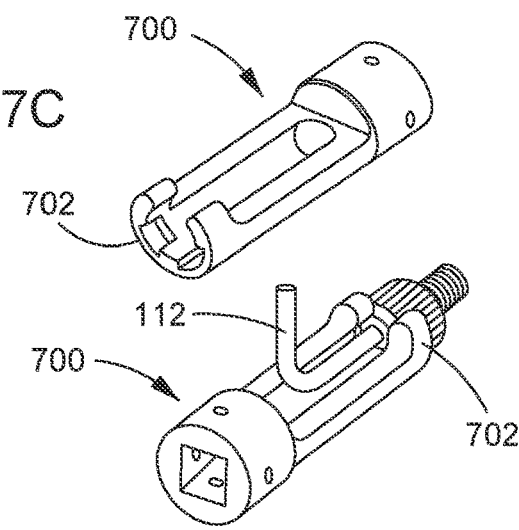
FIG. 7E

FITTING, FITTING ASSEMBLY, AND TORQUE ADAPTOR

CROSS REFERENCE TO RELATED APPLICATION

This application claims the benefit of U.S. Provisional Patent Application No. 63/024,842, entitled "FITTING, FITTING ASSEMBLY, AND TORQUE ADAPTOR" filed May 14, 2020, the disclosure of which is incorporated by reference in its entirety for all purposes.

TECHNOLOGY FIELD

The present disclosure relates generally to a fitting and a fitting assembly for tubing connection. The present disclosure further relates to a torque adaptor specifically designed for the fitting and the fitting assembly.

BACKGROUND

Tubing connections are used in a variety of systems, and used for transporting fluids, gases, or other semi-solid materials. To ensure a leak-free tubing connection, a seal created using a flanged tubing (i.e., flared tubing) connection must be compressed with a sufficient force. This force is typically generated by a threaded fitting that is screwed down onto a tubing flange (i.e., tubing flare). To provide a consistent force, the threaded fitting is preferably tightened using a torque wrench as opposed to hand insertion. However, the existing threaded fittings are designed only for hand tight insertion, and thus are not fit for the use of a torque wrench or a torque driver.

SUMMARY

Embodiments of the present invention address and overcome one or more of the above shortcomings and drawbacks, by providing a fitting assembly for a tubing connection and a torque adaptor specifically designed for the fitting assembly.

Embodiments provide a male fitting for tubing connection, including: a head comprising a plurality of first gripping portions, each first gripping portion extending from a top of the head; and a shaft attached to the head, wherein the shaft comprises a plurality of external threads.

Embodiments further provide a male fitting for tubing connection, wherein each first gripping portion includes one or more indentations.

Embodiments further provide a male fitting for tubing connection, wherein the head further comprises a plurality of second gripping portions, wherein each second gripping portion is shorter than each first gripping portion, and each of the first gripping portions and the second gripping portions has one or more indentations.

Embodiments further provide a male fitting for tubing connection, wherein three first gripping portions and three second gripping portions are included in the head, and each first gripping portion is alternated with each second gripping portion.

Embodiments further provide a male fitting for tubing connection, wherein two sides of each first gripping portion are oblique, and the two sides of each first gripping portion are not perpendicular to a bottom of the head.

Embodiments provide a female fitting for tubing connection, including: a head including a plurality of first gripping portions, each first gripping portion extending from a top of the head; and a cylindrical body having internal threads.

Embodiments further provide a female fitting for tubing connection, wherein each first gripping portion includes one or more indentations.

Embodiments further provide a female fitting for tubing connection, wherein the head further comprises a plurality of second gripping portions, wherein each second gripping portion is shorter than each first gripping portion, and each of the first gripping portions and the second gripping portions has one or more indentations.

Embodiments further provide a female fitting for tubing connection, wherein three first gripping portions and three second gripping portions are included in the head, and each first gripping portion is alternated with each second gripping portion.

Embodiments further provide a female fitting for tubing connection, wherein two sides of each first gripping portion are oblique, and the two sides of each first gripping portion are not perpendicular to a bottom of the head.

Embodiments provide a male fitting assembly for tubing connection, including: a male fitting shaped to be connected to a tube, wherein the male fitting comprises: a head including a plurality of first gripping portions, each first gripping portion extending from a top of the head; and a shaft attached to the head and comprising a plurality of external threads; a first washer configured to contact a tubing flare of the tube and distribute a force evenly around the tubing flare; an O-ring, configured to contact the first washer; and a second washer configured to contact the male fitting and the O-ring so that the male fitting rotates without moving the O-ring. The O-ring is configured to (i) be located between the first washer and the second washer, and (ii) distribute the force to the first washer evenly.

Embodiments further provide a male fitting assembly for tubing connection, wherein each first gripping portion includes one or more indentations.

Embodiments further provide a male fitting assembly for tubing connection, wherein the head further comprises a plurality of second gripping portions, wherein each second gripping portion is shorter than each first gripping portion, and each of the first gripping portions and the second gripping portions has one or more indentations.

Embodiments further provide a male fitting assembly for tubing connection, wherein three first gripping portions and three second gripping portions are included in the head, and each first gripping portion is alternated with each second gripping portion.

Embodiments further provide a male fitting assembly for tubing connection, wherein two sides of each first gripping portion are oblique, and the two sides of each first gripping portion are not perpendicular to a bottom of the head.

Embodiments provide a female fitting assembly for tubing connection, including: a female fitting comprising: a head including a plurality of first gripping portions, each first gripping portion extending from a top of the head; and a cylindrical body having internal threads; a first washer, configured to contact a tubing flare of a tube and distribute a force evenly around the tubing flare.

Embodiments further provide a female fitting assembly for tubing connection, further comprising: an O-ring, configured to contact the first washer; and a second washer configured to contact the female fitting so that the female fitting rotates without moving the O-ring; wherein the O-ring is configured to (i) be located between the first washer and the second washer, and (ii) distribute the force to the first washer evenly.

Embodiments further provide a female fitting assembly for tubing connection, wherein the head further comprises a plurality of second gripping portions, wherein each second gripping portion is shorter than each first gripping portion, and each of the first gripping portions and the second gripping portions has one or more indentations.

Embodiments further provide a female fitting assembly for tubing connection, wherein three first gripping portions and three second gripping portions are included in the head, each first gripping portion is alternated with each second gripping portion.

Embodiments further provide a female fitting assembly for tubing connection, wherein two sides of each first gripping portion are oblique, and the two sides of each first gripping portion are not perpendicular to a bottom of the head.

Embodiments provide a torque adaptor configured to mate with a head of a fitting for tubing connection, including: a fitting mating portion comprising an opening shaped to accommodate the head of the fitting, wherein the head of the fitting includes a plurality of first gripping portions, each first gripping portion extending from a top of the head, and one or more sides of one or more first gripping portions presses against the fitting mating portion; and a torque applying portion comprising a hole shaped to accommodate an end of a torque tool.

Embodiments further provide a torque adaptor, wherein the head of the fitting further comprises a plurality of second gripping portions, wherein each second gripping portion is shorter than each first gripping portion, and each of the first gripping portions and the second gripping portions has one or more indentations.

Embodiments further provide a torque adaptor, wherein three first gripping portions and three second gripping portions are included in the head, and each first gripping portion is alternated with each second gripping portion.

Embodiments further provide a torque adaptor, wherein two sides of each first gripping portion are oblique, and the two sides of each first gripping portion are not perpendicular to a bottom of the head.

Embodiments further provide a torque adaptor, wherein the torque applying portion is cylinder shaped, and the hole is square shaped.

Additional features and advantages of the invention will be made apparent from the following detailed description of illustrative embodiments that proceeds with reference to the accompanying drawings.

BRIEF DESCRIPTION OF THE DRAWING FIGURES

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIGS. 7A-7E illustrate a torque adaptor having a fitting mating portion of a different shape, in accordance with different embodiments described herein;

Figure 10:
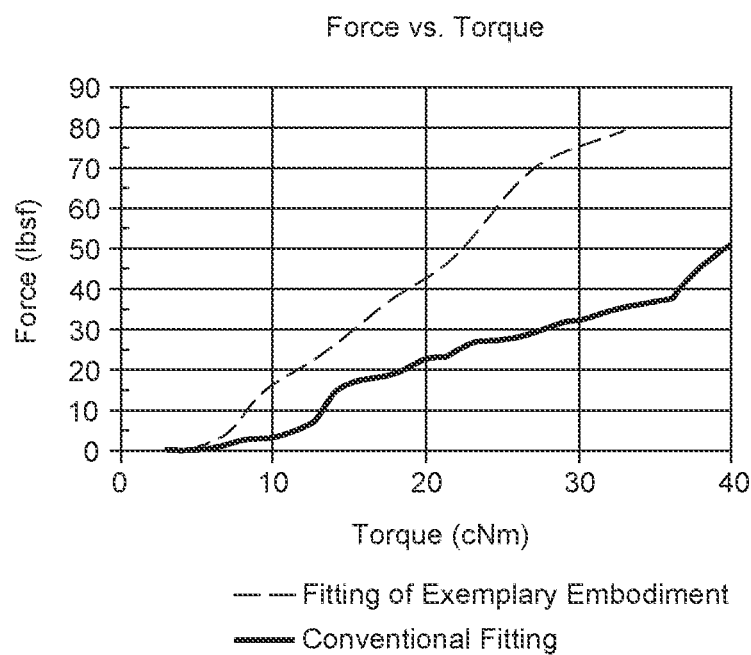
Figure 11:
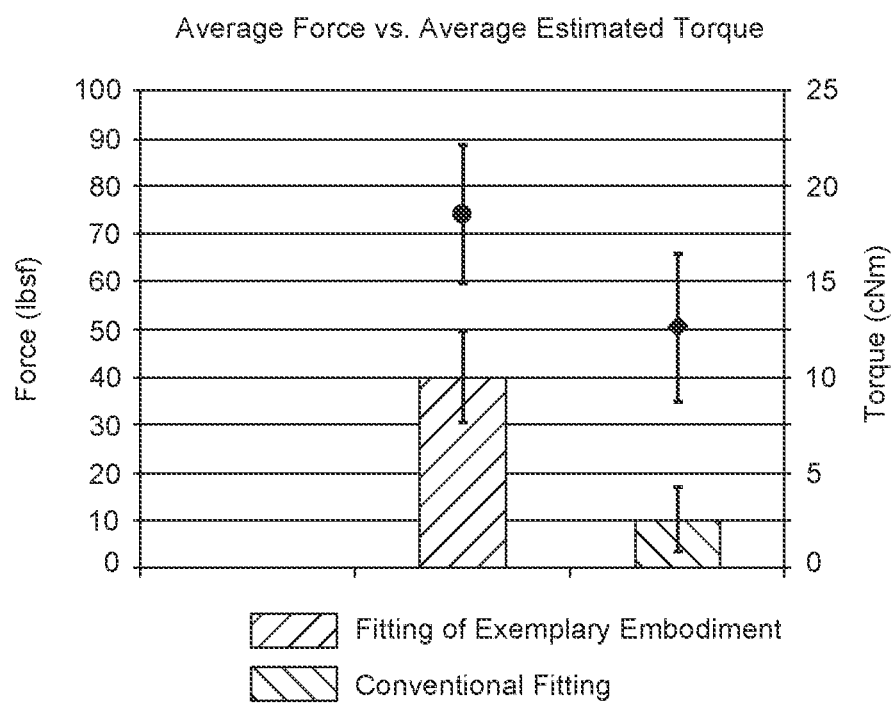

FIG. 10 illustrates a Force (Preload) vs. Torque comparison graph between an exemplary fitting of the invention and a fitting of a conventional system, in accordance with an embodiment described herein; and FIG. 11 illustrates an Average Force (Preload) vs. an Average estimated Torque comparison graph between an exemplary fitting of the invention and a fitting of a conventional system, in accordance with an embodiment described herein.

DETAILED DESCRIPTION

The following disclosure describes the present invention according to several embodiments directed to a fitting and a fitting assembly for tubing connection, as well as a torque adaptor specifically designed for the fitting and the fitting assembly.

The shape of a head of the fitting disclosed herein allows for both a secure finger grip as well as a secure torque tool (e.g., a torque wrench or a torque driver). To allow for the use of the torque tool, a torque adaptor is introduced to be engaged with the head of the fitting and the torque tool. In an embodiment, an end of the torque tool (e.g., a bit) is inserted into a socket of the torque adaptor, so that the torque tool can tighten the fitting assembly through the torque adaptor. A conventional off-the-shelf torque wrench or torque driver can be used to tighten the fitting assembly through the torque adaptor specifically designed for the fitting assembly. The torque adaptor can also prevent the use of some common tools, such as a hex wrench, that could otherwise be used to deliver excessive torque and damage the fitting assembly, because these common tools are not mated with the torque adaptor. The head design of the fitting described herein provides features for an ergonomic feel when the fitting assembly is tightened by hand. The head of the fitting is also sized so that a typical hand-tightening torque will generate a sufficient force to create a seal.

Figure 1:
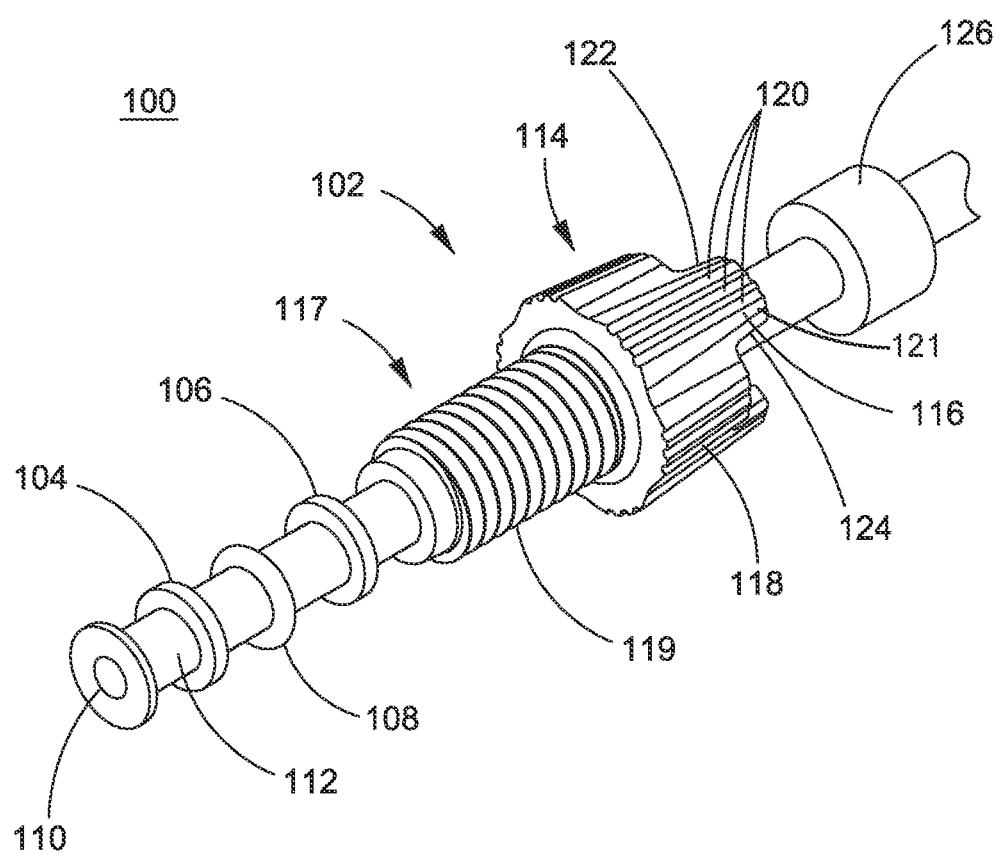
FIG. 1 illustrates an explosive view diagram of the male fitting assembly, in accordance with an embodiment described herein.
Figure 2A:
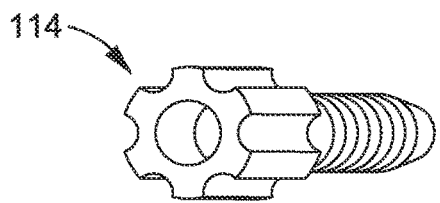
FIGS. 2A-2K illustrate a male fitting having a head of a different shape, in accordance with different embodiments described herein.
Figure 2B:
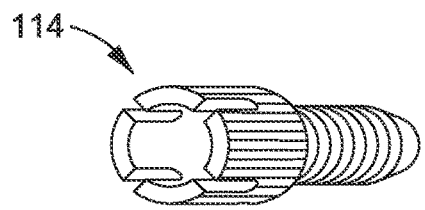
Figure 2C:
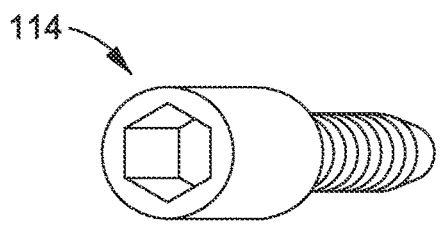
Figure 2D:
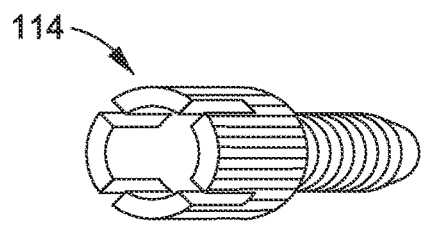
Figure 2E:
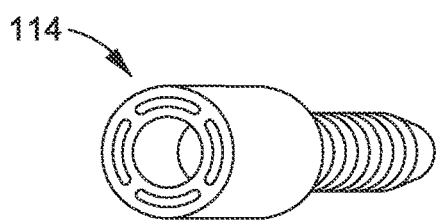
Figure 2F:
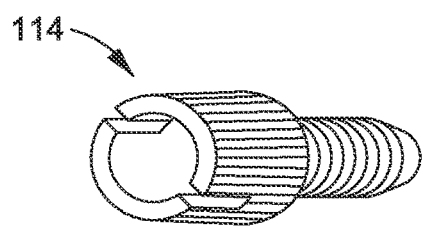
Figure 2G:
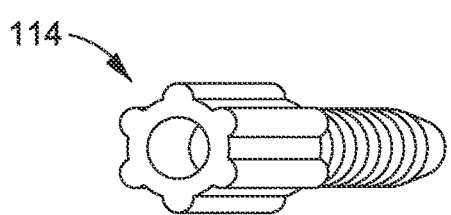
Figure 2H:
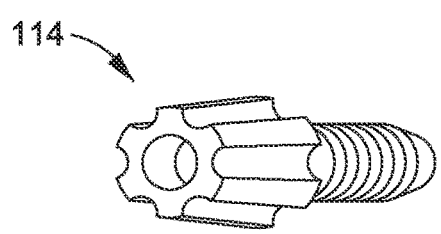
Figure 2I:
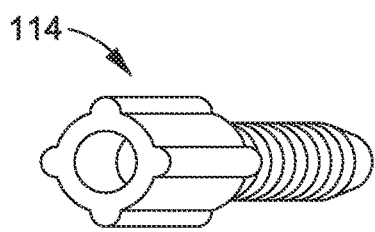
Figure 2J:
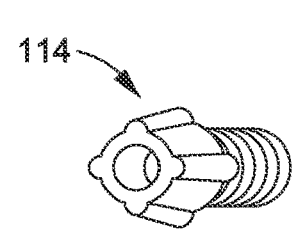
Figure 2K:
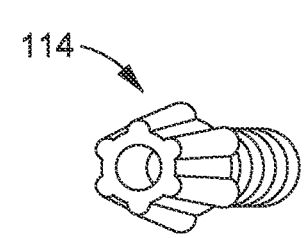

FIG. 1 illustrates an explosive view diagram of the male fitting assembly 100, in accordance with an embodiment described herein. In this example, the male fitting assembly 100 includes a male fitting 102, two washers 104, 106, and an O-ring 108. The first washer 104 is used to distribute a force evenly around a tubing flare 110 of a tube 112, so that an even pressure is formed to create the seal between the male fitting assembly 100 and the tube 112. The tubing flare 110 is a part of the tube 112 and located at an end of the tube 112. The tubing flare 110 that may be used to create, for example, a seal between the tube 112 and another tube (not shown in FIG. 1), between the tube 112 and a manifold port (not shown in FIG. 1), or between the tube 112 and a port (not shown in FIG. 1). For example, when connecting the tube 112 to a manifold port through the male fitting assembly 100, the tubing flare 110 gets squeezed against the bottom of the manifold port, and thus a seal is created between the tube 112 and the manifold port.

The O-ring 108 can be used to distribute force to the first washer 104 evenly. Further, the O-ring 108 can add compliance to the male fitting assembly 100, and thus allow the fitting to seal under a wider range of torques. The O-ring 108 can make the male fitting assembly 100 tolerant to different torque values and tightening on it. The second washer 106 helps the male fitting 102 to rotate without dragging the O-ring 108. The male fitting 102 is designed to rotate smoothly against the second washer 106 and the second washer 106 presses against the O-ring 108. The second washer 106 protects the O-ring 108 from the rotation of the male fitting 102. The male fitting 102 is similar to a bolt, including a head 114 and a shaft 117 having external threads 119.

The head 114 can be of various shapes. For example, FIGS. 2A-2K further illustrate a male fitting having the head 114 of a different shape. In an embodiment, referring to back to FIG. 1, the head 114 is almost cylindrical, and can be divided into a plurality of gripping portions 116, 118. The number of gripping portions 116, 118 can vary; in the example of FIG. 1, the head 114 has six gripping portions 116, 118. Three gripping portions 116 extend upwards from the top of the head 114, and thus are longer than the other three gripping portions 118. The six gripping portions 116, 118 are spaced evenly, and a shorter gripping portion 118 is alternated with a longer gripping portion116. In an embodiment, the extension portion 121 (i.e., the portion extending upwards from the top of the head 114) of each longer gripping portion 116 can be engaged with a torque adaptor specifically designed for the head 114 of the male fitting 102, so that the male fitting assembly 100 can be tightened by a torque tool through the torque adaptor.

There is a plurality of indentations 120 provided on each gripping portion 116, 118, thus forming bumps or ridges on each gripping portion 116, 118. As with the number of gripping portions, the number of indentations can vary. In the example of FIG. 1, there are three indentations on each gripping portion, and thus three bumps or ridges are formed on each gripping portion accordingly. In an embodiment, two sides of each gripping portion116, 118 can be straight (i.e., each gripping portion116, 118 is perpendicular to the bottom of the head 114). Accordingly, two sides of each extension portion 121 are straight. In another embodiment, two sides of each gripping portion116, 118 can be oblique (i.e., each gripping portion116, 118 is not perpendicular to the bottom of the head 114). Accordingly, two sides of each extension portion 121 are oblique. Where each gripping portion 116, 118 has oblique sides, the head 114 is more ergonomic for a human hand if the male fitting assembly 100 is tightened manually by the human hand.

Figure 3A:
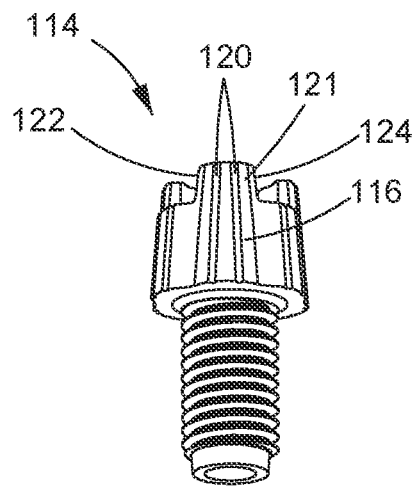
FIGS. 3A-3D illustrate a male fitting, in accordance with different embodiments described herein.
Figure 3B:
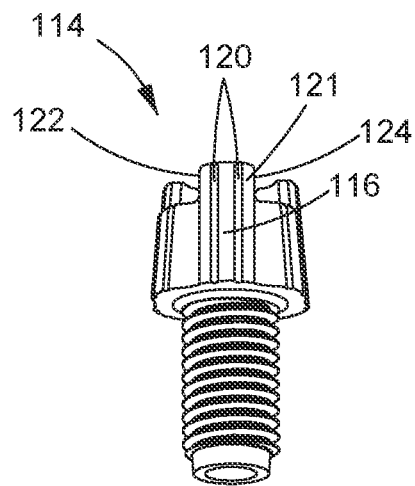
Figure 3C:
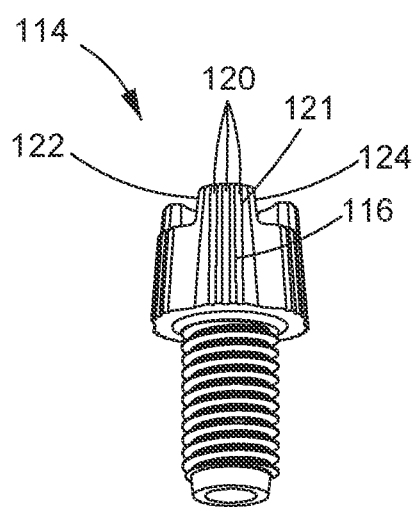
Figure 3D:
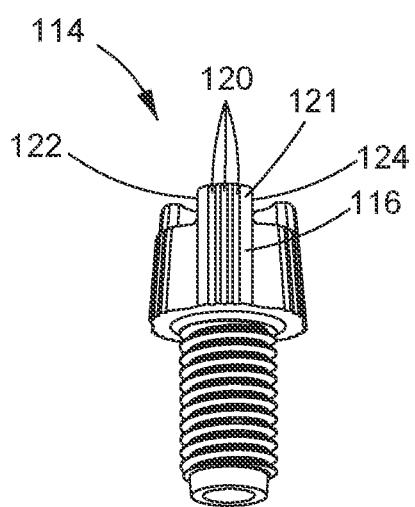

As shown in FIG. 3A, in an embodiment, there are two indentations 120 on each gripping portion, and two sides 122, 124 of each extension portion 121 can be oblique. As shown in FIG. 3B, in another embodiment, there are two indentations 120 on each gripping portion, and two sides 122, 124 of each extension portion 121 can be straight. As shown in FIG. 3C, in an embodiment, there are three indentations 120 on each gripping portion, and two sides 122, 124 of each extension portion 121 can be oblique. As shown in FIG. 3D, in another embodiment, there are three indentations 120 on each gripping portion, and two sides 122, 124 of each extension portion 121 can be straight.

In an embodiment, the male fitting assembly 100 further includes a tubing keeper 126 surrounding the tube 112, used to prevent the other components including the male fitting 102, two washers 104, 106, and the O-ring 108, from sliding backward. The tubing keeper 126 is close to the head 114 of the male fitting 102, but there is a gap between the tubing keeper 126 and the head 114 of the male fitting 102. The male fitting 102 can be made of a polymer material, for example, nylon, polycarbonate, PVDF (Polyvinylidene fluoride or polyvinylidene difluoride), PEEK (Polyether ether ketone), plastic, metal, etc. In an embodiment, a lubricant can be added to or embedded in the polymer material of the male fitting 102, so that it can be easily screwed in. The tube 112 having a tubing flare 110 can be an Ethylene tetrafluoroethylene (ETFE) tube or a FEP (Fluorinated ethylene propylene) tube. EFTE and FEP are both inert, Fluoropolymer-based polymers. In an embodiment, the two washers 104, 106 are made of a stiff material (e.g., stainless steel). The O-ring 108 is made of an elastomer material that is chemically resistant(e.g., fluoroelastomer (FKM), ethylene propylene dieneterpolymer (EPDM), or perfluoroelastomer (FFKM)).

Figure 4A:
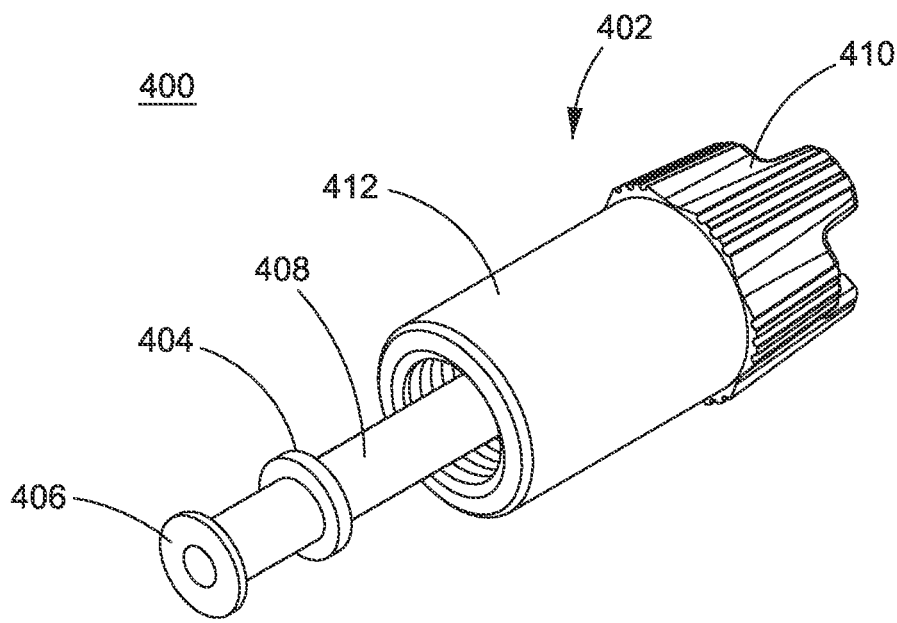
FIGS. 4A-4B illustrate an explosive view diagram of the male fitting assembly, in accordance with different embodiments described herein.
Figure 4B:
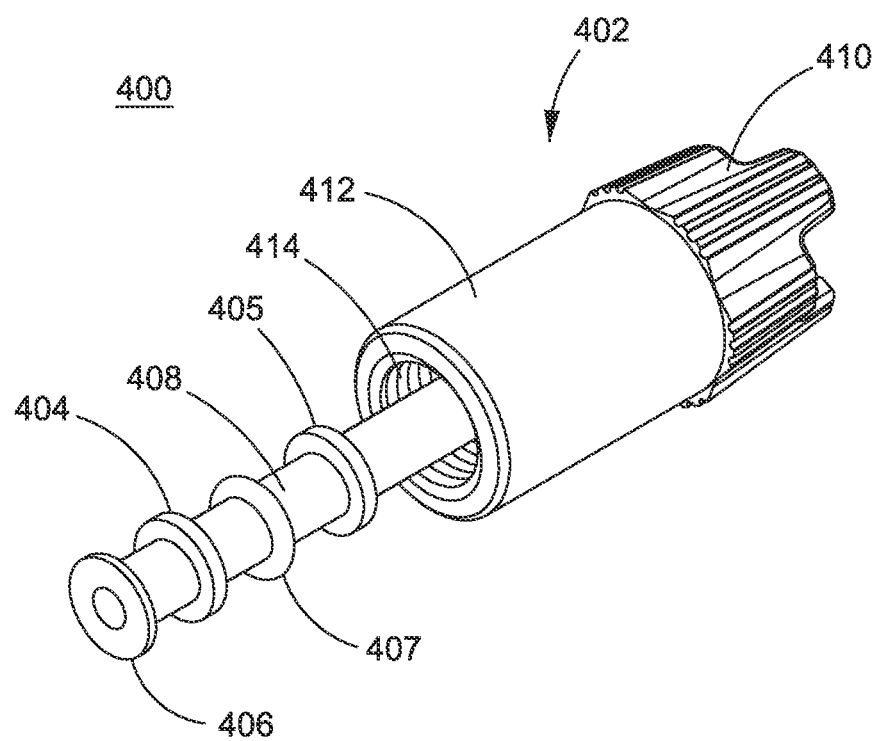

FIG. 4A illustrates an explosive view diagram of the female fitting assembly 400, in accordance with an embodiment described herein. In an embodiment, if the female fitting assembly 400 is to be connected to the male fitting assembly 100, then the female fitting assembly 400 includes a female fitting 402 and a washer 404, without an O-ring. The male fitting assembly 100 already includes the O-ring 108, and only one O-ring is needed when connecting the female fitting assembly 400 and the male fitting assembly 100. The washer 404 is used to distribute a force evenly around a tubing flare 406 of a tube 408, so that an even pressure is formed to create the seal. In another embodiment, if the female fitting assembly 400 is to be connected to a male connector, a manifold port, or a port, then similarly to the male fitting assembly 100, the female fitting assembly 400 as shown in FIG. 4B includes a female fitting 402, two washers 404, 405, and an O-ring 407. The female fitting 402 includes a head 410 and a cylindrical hollow body 412. The head 410 of the female fitting 402 is the same as the male fitting 102. An inner wall of the cylindrical hollow body 412 has internal threads 414 engaged with external threads 119 of the male fitting 102. The female fitting 402 can be made of the same material as that of the male fitting 102, or can be made of a different material.

Figure 5A:
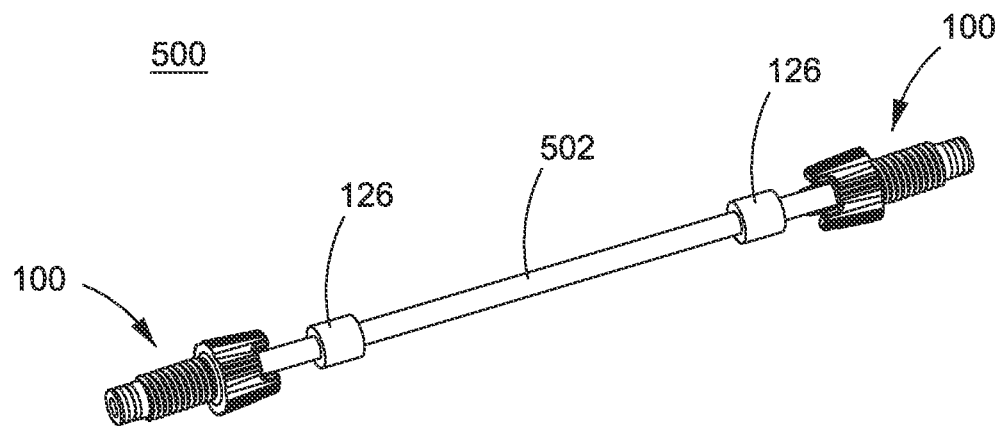
FIGS. 5A-5B illustrate a diagram of the tubing assembly, in accordance with different embodiments described herein.

FIG. 5A illustrates a diagram of the tubing assembly 500, in accordance with an embodiment described herein. In an embodiment, the tubing assembly 500 includes a tube 502 and two male fitting assemblies 100. Each end of the tube 502 is connected to a male fitting assembly 100. In another embodiment, each male fitting assembly 100 further includes a tubing keeper 126. Each tubing keeper is close to a head 114 of each male fitting 102.

Figure 5B:
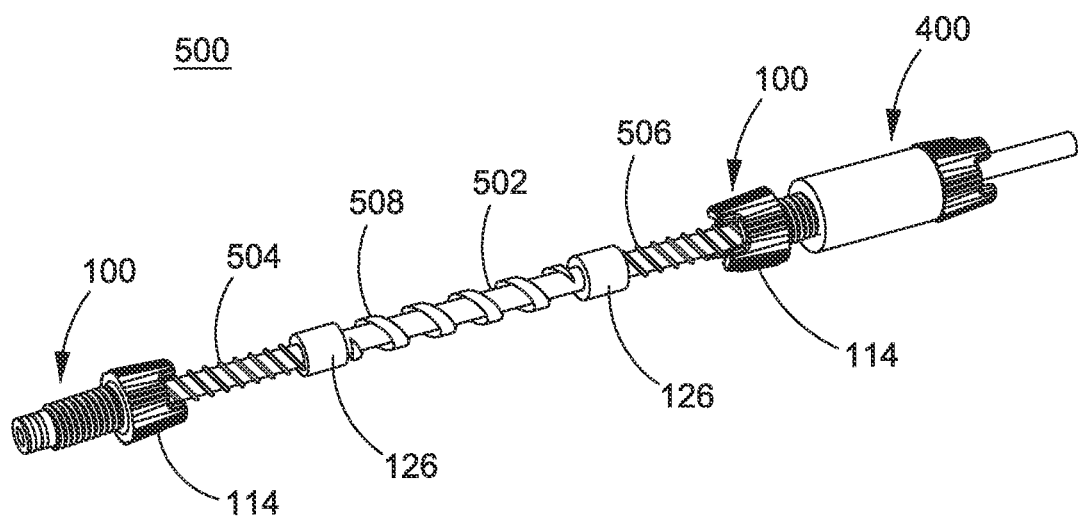

FIG. 5B illustrates a diagram of the tubing assembly 500, in accordance with an embodiment described herein. In an embodiment, the tubing assembly 500 includes a tube 502, two male fitting assemblies 100, two springs 504, 506, and a spiral wrap 508. Each spring surrounds a part of the tube 502 and is located between a head 114 of the male fitting 102 and a tubing keeper 126. Each spring 504, 506 is used to prevent kinking of the tube 502 due to bending or other handling operations. The spiral wrap 508 is used to protect the tube 502 having a smaller diameter (and thus more fragile), and is located between two tubing keepers 126. The spiral wrap 508 can also be used to bundle multiple tubing assemblies 500 together. As shown in FIG. 5B, a female fitting assembly 400 can be connected to a male fitting assembly 100.

Figure 6A:
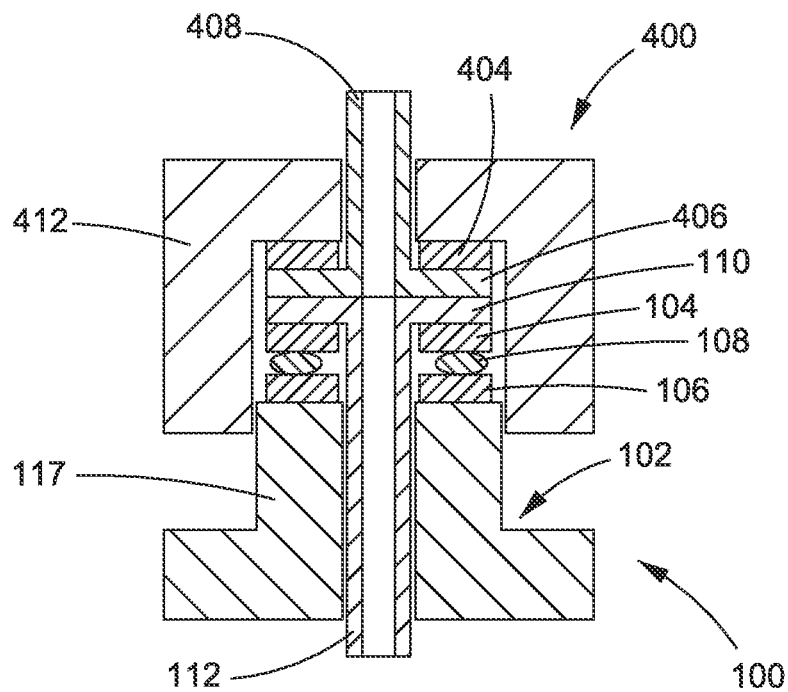
FIG. 6A-6B illustrates a diagram showing a male fitting assembly connected to a female fitting assembly 400, in accordance with different embodiments described herein.

FIG. 6A illustrates a diagram showing a male fitting assembly 100 connected to a female fitting assembly 400, in accordance with an embodiment described herein. The tubing flare 406 connected to the female fitting assembly 400 faces and presses against the tubing flare 110 connected to the male fitting assembly 100. The external threads 119 (see FIG. 1) on a shaft 117 of the male fitting 102 are engaged with internal threads 414 (see FIG. 4B) on the inner wall of the female fitting body 412. The first washer 104 of the male fitting assembly 100 contacts the tubing flare 110 connected to the male fitting assembly 100, while the second washer 106 of the male fitting assembly 100 contacts the shaft 117. The O-ring 108 is located between the first washer 104 and the second washer 106. The male fitting 102 rotates smoothly against the second washer 106, and the second washer 106 presses against the O-ring 108. The first washer 104 of the male fitting assembly 100 and the third washer 404 of the female fitting assembly 400 distribute the force evenly around the two tubing flares 110, 406, so that an even pressure is formed to create a seal between the two tubing flares 110, 406. In this way, the tube 408 connected to the female fitting assembly 400 and the tube 112 connected to the male fitting assembly 100 are securely connected.

Figure 6B:
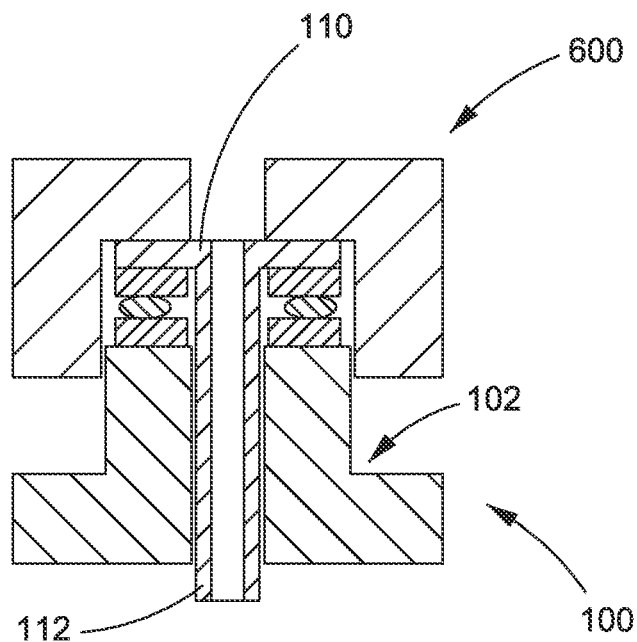

FIG. 6B illustrates a diagram showing a male fitting assembly 100 connected to a manifold port 600, in accordance with an embodiment described herein. The difference between this embodiment and the embodiment shown in FIG. 6A is that the tubing flare 110 of the male fitting assembly 100 presses against an inlet of a manifold port 600. In an embodiment, the male fitting assembly 100 can be connected to any mating port as long as the male fitting 102 can be inserted into the mating port, and the external threads 119 (see FIG. 1) on the male fitting 102 can be engaged with the internal threads on an inner wall of the mating port.

FIG. 7A illustrates a diagram of a torque adaptor 700, in accordance with an embodiment described herein. The torque adaptor 700 includes a fitting mating portion 702 and a torque applying portion 704. The fitting mating portion 702 of the torque adaptor 700 can be of various shapes. As shown in FIGS. 7B-7E, the fitting mating portion 702 has a different shape. In the example of FIG. 7A, the fitting mating portion 702 is of a hollow cylinder shape, and there is an opening 706 at the top of the fitting mating portion 702, and the fitting mating portion 702 can comprise one or more recesses configured to engage one or more of the longer gripping portions 116 of the head 114. Referring to FIG. 1 and FIGS. 7B-7E, the fitting mating portion 702 is engaged with a head 114 of the male fitting 102 or a head 410 of the female fitting 402. Two sides 122 and 124 of the extension portion 121 of at least one longer gripping portion 116 of the head 114 press against the inner walls of a recess of the fitting mating portion 702. The head 114 of the male fitting 102 or the head 410 of the female fitting 402 is securely engaged with the fitting mating portion 702, and thus there is no slippage between the head 114 and the fitting mating portion 702. The tube 112 extends from the head 114, and is located in the slot 708 when the longer gripping portion 116 of the head 114 is engaged with the fitting mating portion 702. The slot 708 is used to accommodate and clear the tube 112 when the male fitting 102 or the female fitting 402 is being tightened through the torque adaptor 700. In an embodiment, the torque applying portion 704 is of a cylinder shape, and there is a hole or socket 712, e.g., a square-shaped hole or socket 712 in the torque applying portion 704. An end of the torque tool, e.g., a bit, is inserted into the hole or the socket of the torque applying portion, while the head 114 of the male fitting 102 or the head 410 of the female fitting 402 is engaged with the fitting mating portion 702.

When a user applies a force on a handle of the torque tool, the force can be conveyed, for example, from the hand, through the bit, the torque applying portion 704, the fitting mating portion 702, to the head 114 of the male fitting 102 or female fitting 402. Thus, the torque tool can tighten the fitting assembly (the male fitting assembly 100 or the female fitting assembly 400) by means of the torque adaptor 700. A conventional off-the-shelf torque tool (e.g., a torque wrench or a torque driver) can be used to tighten the fitting assembly through the torque adaptor 700 specifically designed for the fitting assembly. In an embodiment, a user can apply a force on the torque applying portion 704 by hand, without a torque tool; while the head 114 of the male fitting 102 or the female fitting 402 is engaged with the fitting mating portion 702. This manual mode can be used where the head 114 of the male fitting 102 or female fitting 402 is difficult to reach.

Figure 8:
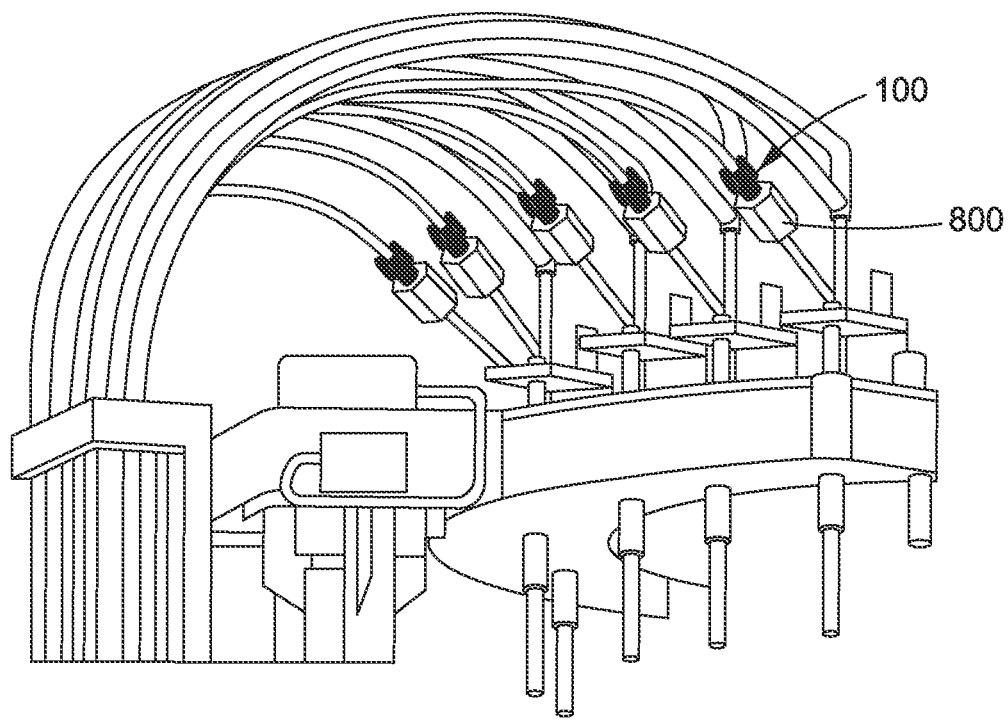
FIG. 8 illustrates a scenario where the male fitting assembly is connected to a metal joint 800, in accordance with an embodiment described herein.
Figure 9:
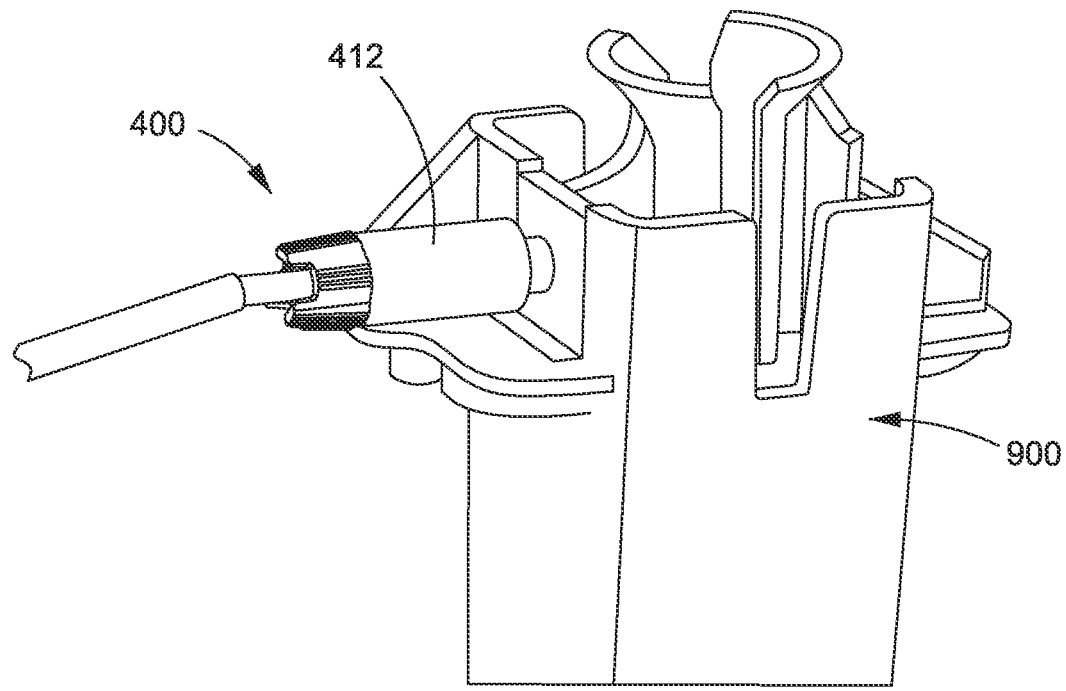
FIG. 9 illustrates a scenario where the female fitting assembly is connected to a nozzle, in accordance with an embodiment described herein.

The male fitting assembly 100 or the female fitting assembly 400 can be used in different scenarios, in which tubing connection is needed. For example, as shown in FIG. 8, a male fitting assembly 100 can be connected to a metal joint 800. An inner wall of the metal joint 800 has internal threads 414 mating with external threads 119 of the male fitting 102. For another example, as shown in FIG. 9, a female fitting assembly 400 can be connected to a nozzle 900. An end of a female fitting body 412 is engaged with an externally threaded port of the nozzle 900.

FIG. 10 illustrates a Force (Preload) vs. Torque comparison graph between an exemplary fitting (male fitting 102 or female fitting 402) and a fitting of a conventional fitting (e.g., a standard commercially available ¼"-28 threaded fitting). As shown in FIG. 10, the exemplary fitting can generate a larger force or preload than that of the standard fitting, in case of the same torque. In other words, the exemplary fitting can generate a higher sealing pressure than that of the standard fitting. Thus, the exemplary fitting is more efficient at converting torque to a preload than the standard fitting.

FIG. 11 illustrates an Average Force (Preload) vs. an Average estimated Torque comparison graph between an exemplary fitting (male fitting 102 or female fitting 402) and a fitting of a conventional fitting (e.g., a standard fitting). The exemplary fitting is tightened by a plurality of users, and FIG. 11 depicts an average force and an average estimated torque comparison. As shown in FIG. 11, the exemplary fitting can generate a larger force or preload and a higher initial torque than those of the standard fitting. It can be inferred that the exemplary fitting has a better grip.

The present description and claims may make use of the terms "a," "at least one of," and "one or more of," with regard to particular features and elements of the illustrative embodiments. It should be appreciated that these terms and phrases are intended to state that there is at least one of the particular features or elements present in the particular illustrative embodiment, but that more than one may also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes may be implemented using hardware components, software components, and/or combinations thereof. No claim element herein is to be construed under the provisions of 35 U.S.C. 112(f) unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A male fitting for tubing connection, comprising:
a head comprising:
 a plurality of first gripping portions, each first gripping portion extending vertically from a top of the head, and
 a plurality of second gripping portions, each second gripping portion is shorter than each first gripping portion, wherein each first gripping portion is alternated with each second gripping portion; and
a shaft attached to the head, wherein the shaft comprises a plurality of external threads,
wherein the male fitting can be tightened by hand or by a torque tool through a torque adapter comprising a fitting mating portion configured to receive one or more of the plurality of first gripping portions.

2. The male fitting as recited in claim 1, wherein each first gripping portion includes one or more indentations.

3. The male fitting as recited in claim 1, wherein each of the first gripping portions and the second gripping portions has one or more indentations.

4. The male fitting as recited in claim 3, wherein three first gripping portions and three second gripping portions are included in the head.

5. The male fitting as recited in claim 1, wherein two sides of each first gripping portion are oblique, and the two sides of each first gripping portion are not perpendicular to a bottom of the head.

6. A female fitting for tubing connection, comprising:
a head including:
 a plurality of first gripping portions, each first gripping portion extending vertically from a top of the head, and
 a plurality of second gripping portions, wherein each second gripping portion is shorter than each first gripping portion, wherein each first gripping portion is alternated with each second gripping portion; and
a cylindrical body having internal threads,
wherein the female fitting can be tightened by hand or by a torque tool through a torque adapter comprising a fitting mating portion configured to receive one or more of the plurality of first gripping portions.

7. The female fitting as recited in claim 6, wherein each first gripping portion includes one or more indentations.

8. The female fitting as recited in claim 6, wherein each of the first gripping portions and the second gripping portions has one or more indentations.

9. The female fitting as recited in claim 8, wherein three first gripping portions and three second gripping portions are included in the head.

10. The female fitting as recited in claim 8, wherein two sides of each first gripping portion are oblique, and the two sides of each first gripping portion are not perpendicular to a bottom of the head.

11. A male fitting assembly for tubing connection, comprising:
a male fitting shaped to be connected to a tube, wherein the male fitting comprises:
 a head including a plurality of first gripping portions, each first gripping portion extending from a top of the head; and
 a shaft attached to the head and comprising a plurality of external threads;
a first washer configured to contact a tubing flare of the tube and distribute a force evenly around the tubing flare;
an O-ring, configured to contact the first washer; and
a second washer configured to contact the male fitting and the O-ring so that the male fitting rotates without moving the O-ring,
wherein the O-ring is configured to (i) be located between the first washer and the second washer, and (ii) distribute the force to the first washer evenly.

12. The male fitting assembly as recited in claim 11, wherein each first gripping portion includes one or more indentations.

13. The male fitting assembly as recited in claim 11, wherein the head further comprises a plurality of second gripping portions, wherein each second gripping portion is shorter than each first gripping portion, and each of the first gripping portions and the second gripping portions has one or more indentations.

14. The male fitting assembly as recited in claim 13, wherein three first gripping portions and three second gripping portions are included in the head, and each first gripping portion is alternated with each second gripping portion.

15. The male fitting assembly as recited in claim 13, wherein two sides of each first gripping portion are oblique, and the two sides of each first gripping portion are not perpendicular to a bottom of the head.

16. A female fitting assembly for tubing connection, comprising:
a female fitting comprising:
 a head including a plurality of first gripping portions, each first gripping portion extending from a top of the head; and a cylindrical body having internal threads;
a first washer, configured to contact a tubing flare of a tube and distribute a force evenly around the tubing flare;
an O-ring, configured to contact the first washer; and
a second washer configured to contact the female fitting so that the female fitting rotates without moving the O-ring;
wherein the O-ring is configured to (i) be located between the first washer and the second washer, and (ii) distribute the force to the first washer evenly.

17. The female fitting assembly as recited in claim 16, wherein the head further comprises a plurality of second gripping portions, wherein each second gripping portion is shorter than each first gripping portion, and each of the first gripping portions and the second gripping portions has one or more indentations.

18. The female fitting assembly as recited in claim 17, wherein three first gripping portions and three second gripping portions are included in the head, each first gripping portion is alternated with each second gripping portion.

19. The female fitting assembly as recited in claim 17, wherein two sides of each first gripping portion are oblique, and the two sides of each first gripping portion are not perpendicular to a bottom of the head.

\* \* \* \* \*